Patented July 9, 1935

2,007,234

UNITED STATES PATENT OFFICE 2,007,234

MANUFACTURE OF MUSK-AMBRETTE

Walter V. Wirth, Woodstown, N. J., assignor to E. I. du Pont de Nemours & Company, Wilmington, Del., a corporation of Delaware No Drawing. Application March 1, 1934, Serial No. 713,523

9 Claims. (Cl. 260—142)

This invention relates to the manufacture of perfume chemicals. More particularly, it relates to an improved process for the manufacture of musk-ambrette.

Musk-ambrette, an important fixative in the perfume art, is generally prepared by nitrating tertiary-butyl-3-methoxy-1-toluene. The structure of the final compound is believed in the art to correspond to the following formula

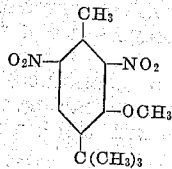

(2,6-dinitro-4-tert-butyl-3-methoxy-toluene; Zeide and Dubinin, Jour. of Gen. Chem—U. S. S. R.—vol. 2, pages 455–471).

During the nitration, however, there is also formed 4.6-dinitro-3-methoxy-toluene

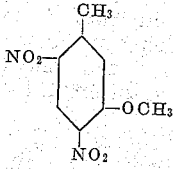

in considerable amounts, the butyl group being replaced by a nitro group. Small quantities of mono-nitro compounds and oxidation products are also formed in the nitration processes.

4,6-dinitro-3-methoxy-toluene is a pale yellow crystalline solid, melting at 101° C.

The practice of the art in the preparation of musk-ambrette is illustrated by the process reported in Ullmann's Enzyklopaedie der technischen chemie, (1st ed.) vol. 9, page 616. According to this process, fuming nitric acid was mixed with tertiary-butyl-3-methoxy-toluene and acetic anhydride at below 0° C., and the mixture then warmed up to 25° C. and held at this temperature for a short while. The reaction mass was then drowned in water, filtered, and the filter cake steam distilled to remove volatile impurities. The residue, which apparently contained considerable quantities of a mono-nitro by-product, was then dissolved in benzol and distilled under a vacuum. The oily residue was then dissolved in alcohol, crystallized, and purified by recrystallization. The yield was reported to be 30% of theory based on the initial quantity of tertiary-butyl-methoxy-toluene, or 45% on the basis of the amount of the same compound lost or consumed in the process.

It will be noted that the process of recovery is rather complicated and laborious, and that the yield is altogether too low.

It is accordingly an object of my invention to improve the process of manufacture of musk-ambrette whereby to increase its efficiency and economy. It is a further object of my invention to provide an improved process for the nitration of tert-butyl-3-methoxy-toluene whereby to obtain a high yield of musk-ambrette. A still further object of my invention is to improve the process of nitration whereby to obtain a crude product which is readily separable into its components, thereby simplifying the recovery. Other and further important objects of this invention will appear as the description proceeds.

I accomplish the objects of my invention by effecting the nitration at a low temperature, that is a temperature of about −10 to +2° C.

I have found that if the reaction is conducted under carefully controlled temperature conditions, whereby the reaction mass is not permitted to rise above 2° at any stage of the nitration, the product consists predominantly of two components, namely musk-ambrette and 4,6-dinitro-3-methoxy-toluene. This is a decided advantage and reduces the cost of the process considerably, for as described and claimed in copending application Serial No. 713,522, by Miles A. Dahlen and myself, the mixture of musk-ambrette and dinitro-methoxy-toluene can be readily separated from each other in substantially pure state by an economical process of extraction by the aid of a solvent comprising non-aromatic hydrocarbons, such as petroleum naphtha or cyclohexane.

Moreover, the yield of the most desirable product, namely musk-ambrette, is considerably increased under the above conditions.

I have found it further advantageous to use in the nitration process an excess of acetic anhydride, or in any event a quantity not less than that theoretically required for insuring anhydrous conditions throughout the reaction, due allowance being made for the initial water content of the nitric acid, water of formation, and purity of the acetic anhydride employed for this purpose. I have found that the conduction of the reaction under such vigorously anhydrous conditions further contributes toward raising the yield of the main product and toward the substantial elimination of mono-nitro compounds and other by-products.

I have further found that the quantity of nitric acid under the conditions indicated may be considerably reduced, thereby effecting further savings from this angle.

Without limiting my invention to any particular procedure, the following example, in which parts by weight are given, will serve to illustrate my preferred mode of operation.

*Example*

An enameled nitrating kettle with jacket for brine cooling was charged with 200 parts of acetic anhydride and cooled to −6° C. Over a period of about 1 hour the following were run in simultaneously, keeping the temperature at −5° to −10° C.

(a) 178 parts of tertiary-butyl-3-methoxy-toluene dissolved in 263 parts of acetic anhydride (b) 356 parts of fuming nitric acid (95%).

The temperature was allowed to rise to 0° C. over 15 minutes and the mass was stirred for 1 hour at 0 to +2° C. It was run into 1100 parts of cold water and 1700 parts of crushed ice over a period of about 15 minutes. The mass was stirred ½ hour, and the resulting light yellow crystalline material was filtered off, washed first with water at 25° to 30° C. until practically acid free, and then with 1% sodium carbonate solution to remove all mineral acidity. It was then washed again with water until neutral, and dried at 50–55° C. The yield was 243 parts of crude nitration product.

The crude nitration product had a crystallizing point of 66° C., and after separation and purification by the method above referred to gave 163 parts of musk-ambrette of M. P. 85° C., and 47.5 parts of 4,6-dinitro-3-methoxy-toluene of M. P. 96–98° C.

The aforementioned process of separation consists, in a general way, of heating the crude nitration product in petroleum naphtha, and filtering. The solid residue constitutes substantially pure 4,6-dinitro-3-methoxy-toluene. The mother liquor is heated to drive off the naphtha, first at atmospheric pressure and later under a vacuum. The crude musk thus obtained is recrystallized twice from alcohol.

It will be understood that the details of our improved process may be varied within wide limits, without departing from the spirit of this invention. Thus, provided the amount of acetic anhydride is sufficient to dehydrate the entire mass, there is no upper limit to the quantity which may be employed, except its cost. In the specific example above submitted an excess of about 50% was employed.

The quantity of nitric acid employed may vary within wide limits. In the process of the art the quantity of nitric acid was over 9 moles per mole of tertiary-butyl-methoxy-toluene. By my improved process, however, good results may be obtained with considerably lesser quantities, for instance 4 to 6 moles. In the specific example above submitted the ratio employed was about 5.5 moles.

The temperature should not be allowed to rise above 2° C. for any appreciable length of time. Although a rise of 3 or 4 degrees above the said limit may be tolerated for a short duration, best results are obtained if the mass is kept consistently below 0° C., until the reaction is finished and the acid has been filtered off.

It will be understood now that my process offers considerable improvements over the practice of the art, in the following respects:

1. The yield of musk-ambrette is about twice that reported in the literature.
2. Practically no other by-products are formed except the one compound 4,6-dinitro-3-methoxy-toluene, which can be separated from the main product by a simple, inexpensive procedure.
3. The recovery of the main product has been simplified and reduced in cost.
4. The quantity and cost of initial materials, especially nitric acid, has been considerably reduced.

All of these factors contribute toward making the manufacture of musk-ambrette a very efficient and highly economical process.

I claim:

1. In the manufacture of musk-ambrette by the nitration of tert-butyl-3-methoxy-toluene, the improvement which comprises conducting the entire nitration at about freezing temperature.

2. In the manufacture of musk-ambrette by the nitration of tert-butyl-3-methoxy-toluene, the improvement which comprises effecting the nitration at a temperature not exceeding 2° C., for any substantial length of time.

3. In the manufacture of musk-ambrette by the nitration of tert-butyl-3-methoxy-toluene, the improvement which comprises effecting the nitration at a temperature between −10 and +2° C.

4. The process of manufacturing musk-ambrette, which comprises reacting upon tert-butyl-3-methoxy-toluene with a mixture of nitric acid and acetic anhydride at a temperature between −10 and +2° C.

5. A process as in claim 4, the proportion of acetic anhydride being not less than that theoretically required for dehydrating the nitric acid employed and for absorbing all the water formed in the reaction.

6. A process as in claim 4, the proportion of acetic anhydride being in excess of that theoretically required for dehydrating the nitric acid employed and for absorbing all the water formed in the reaction.

7. A process as in claim 4, the proportion of acetic anhydride being substantially 50% in excess over that theoretically required for dehydrating the nitric acid employed and for absorbing all the water formed in the reaction.

8. A process as in claim 4, the quantity of nitric acid employed being not substantially over 5.5 moles per mole of tertiary-butyl-3-methoxy-toluene being nitrated, and the proportion of acetic anhydride being in excess of that theoretically required for dehydrating the nitric acid employed and for absorbing all the water formed in the reaction.

9. In the manufacture of musk-ambrette by the nitration of tert-butyl-3-methoxy-toluene, the improvement which comprises effecting the nitration at a temperature not exceeding 2° C. and in the presence of an excess of dehydrating agent whereby to produce a mixture of musk-ambrette and 4,6-dinitro-3-methoxy-toluene substantially free of other by-products, and extracting the reaction mass with petroleum naphtha, whereby to separate the musk-ambrette from the dinitro-methoxy-toluene.

WALTER V. WIRTH.